Patented Sept. 30, 1952

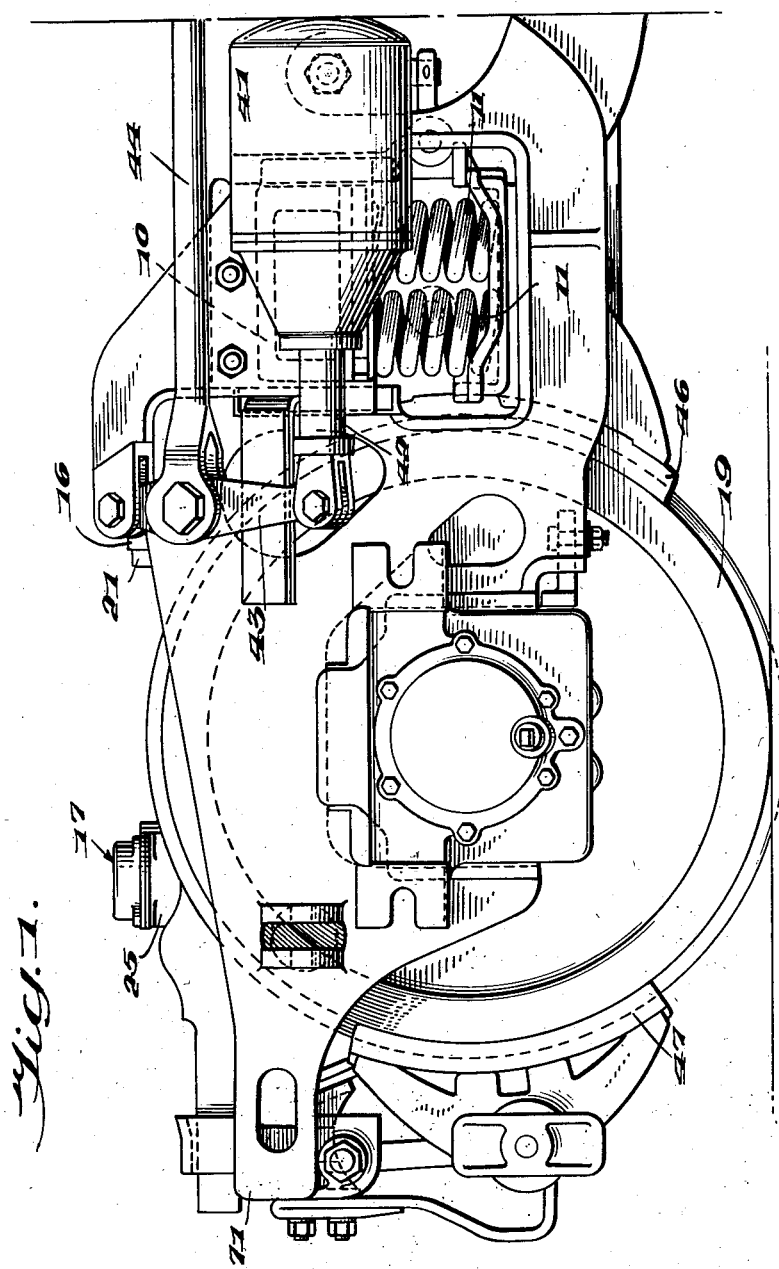

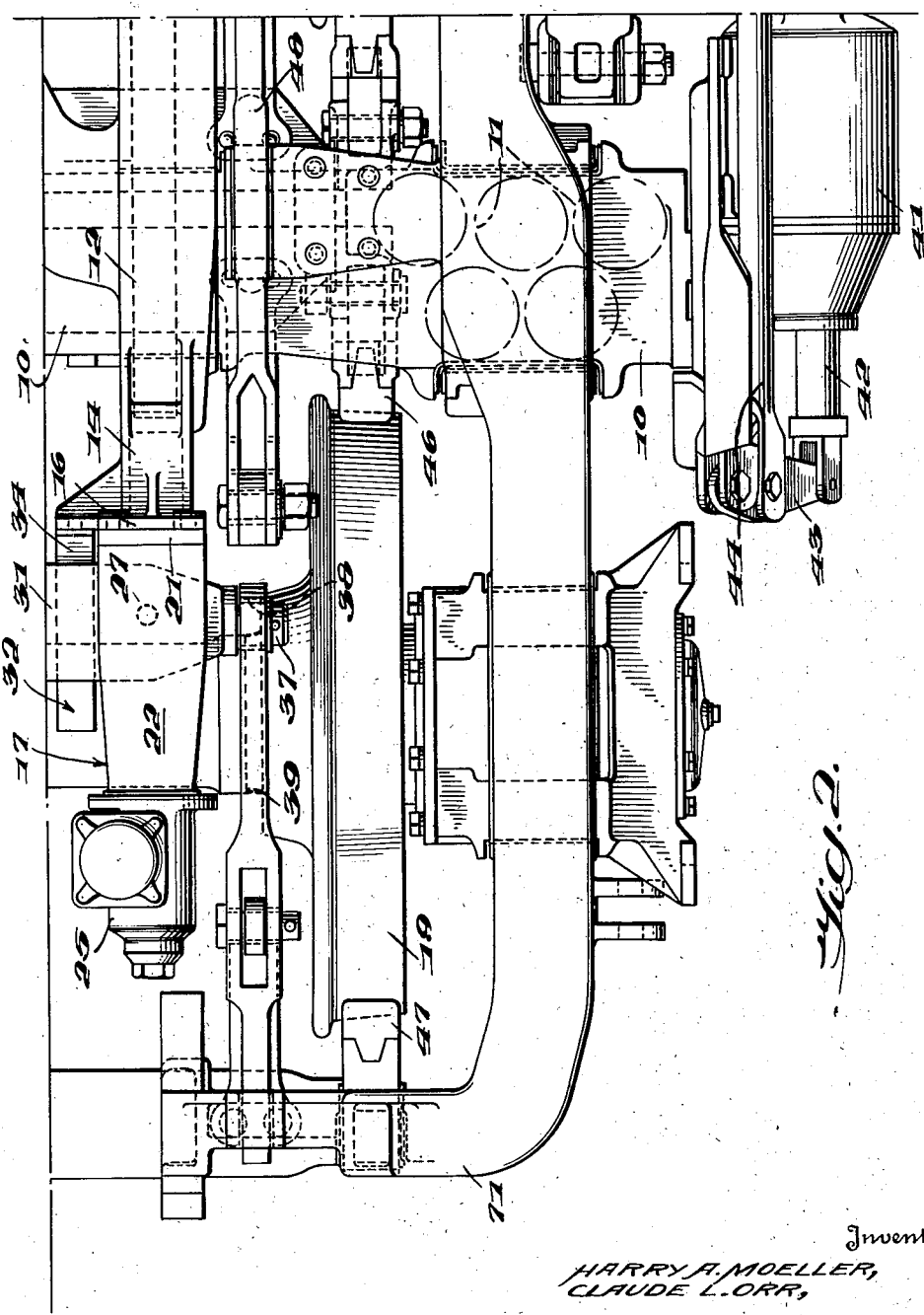

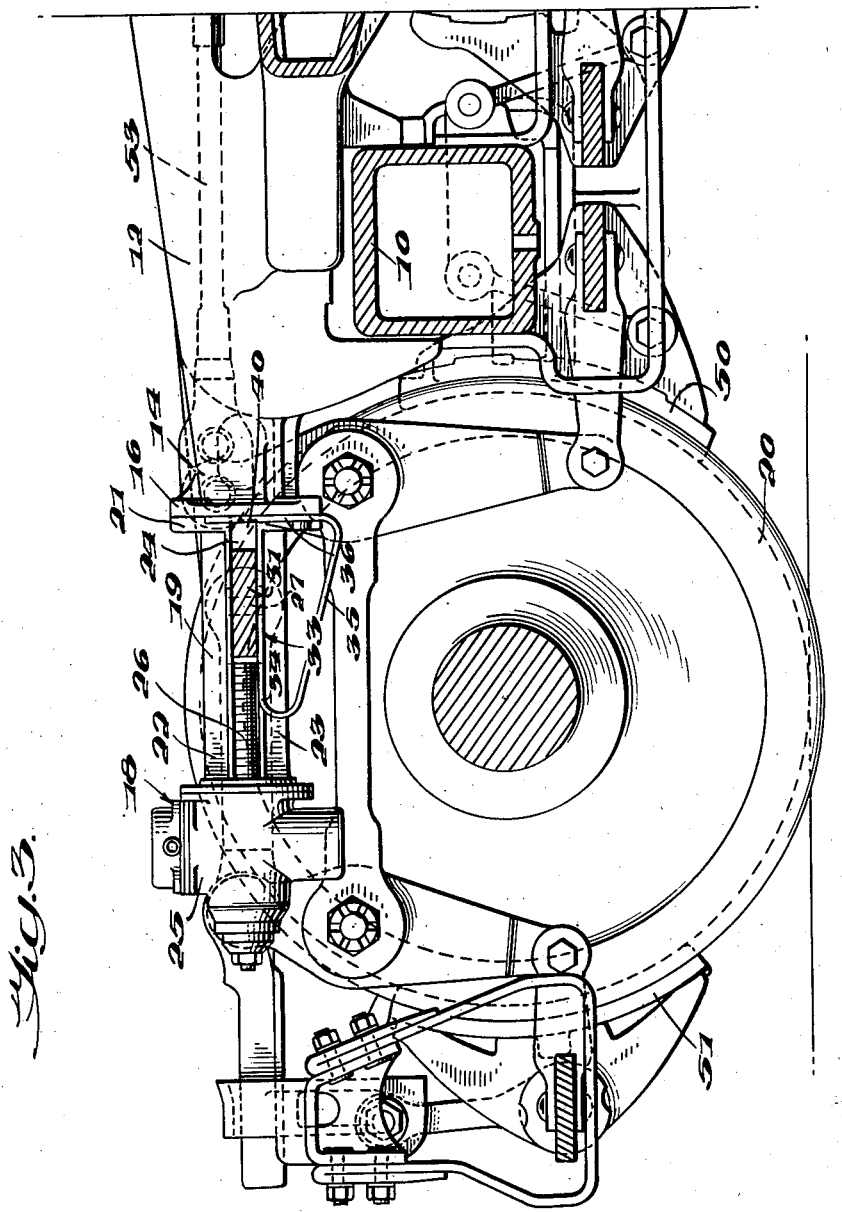

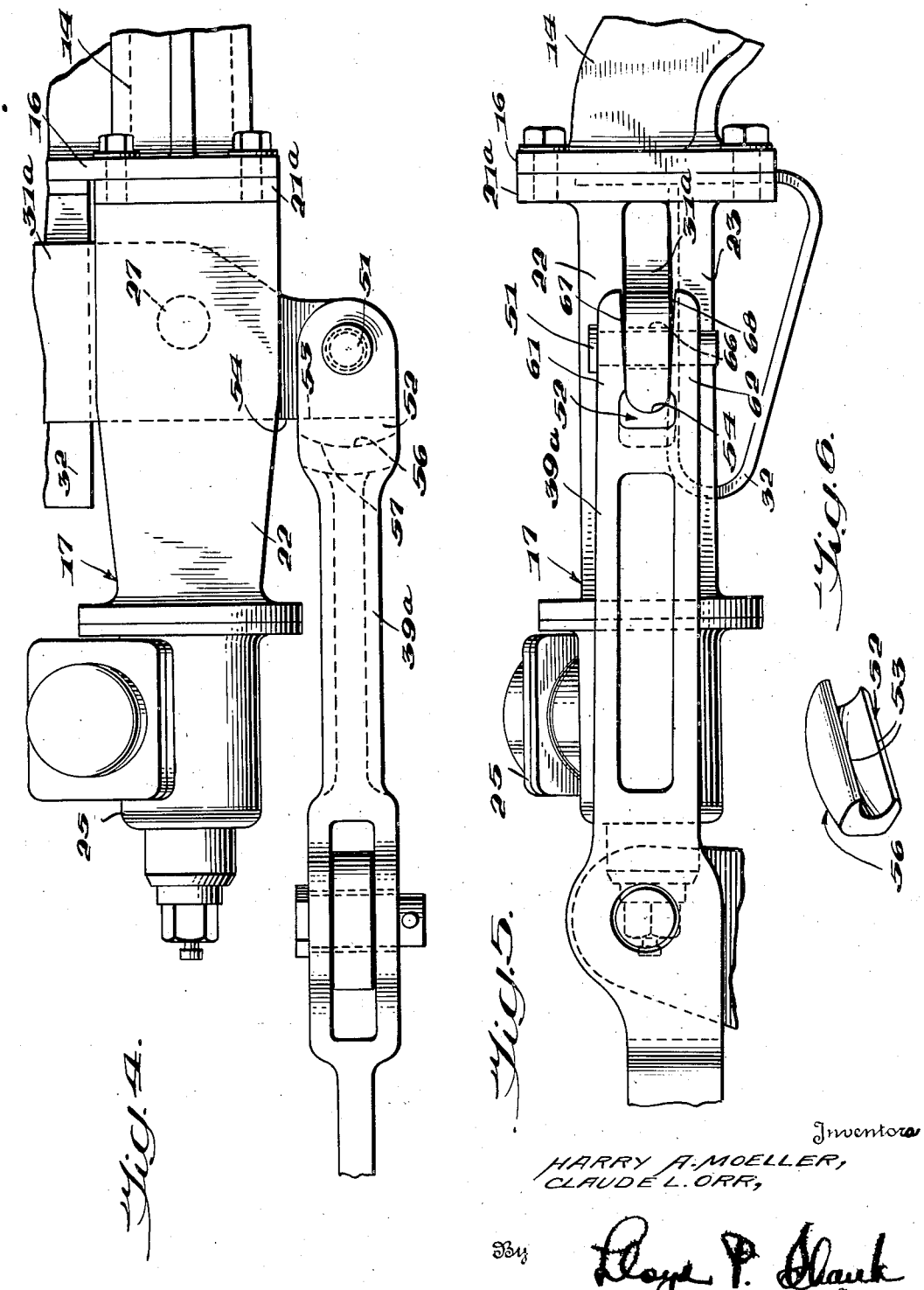

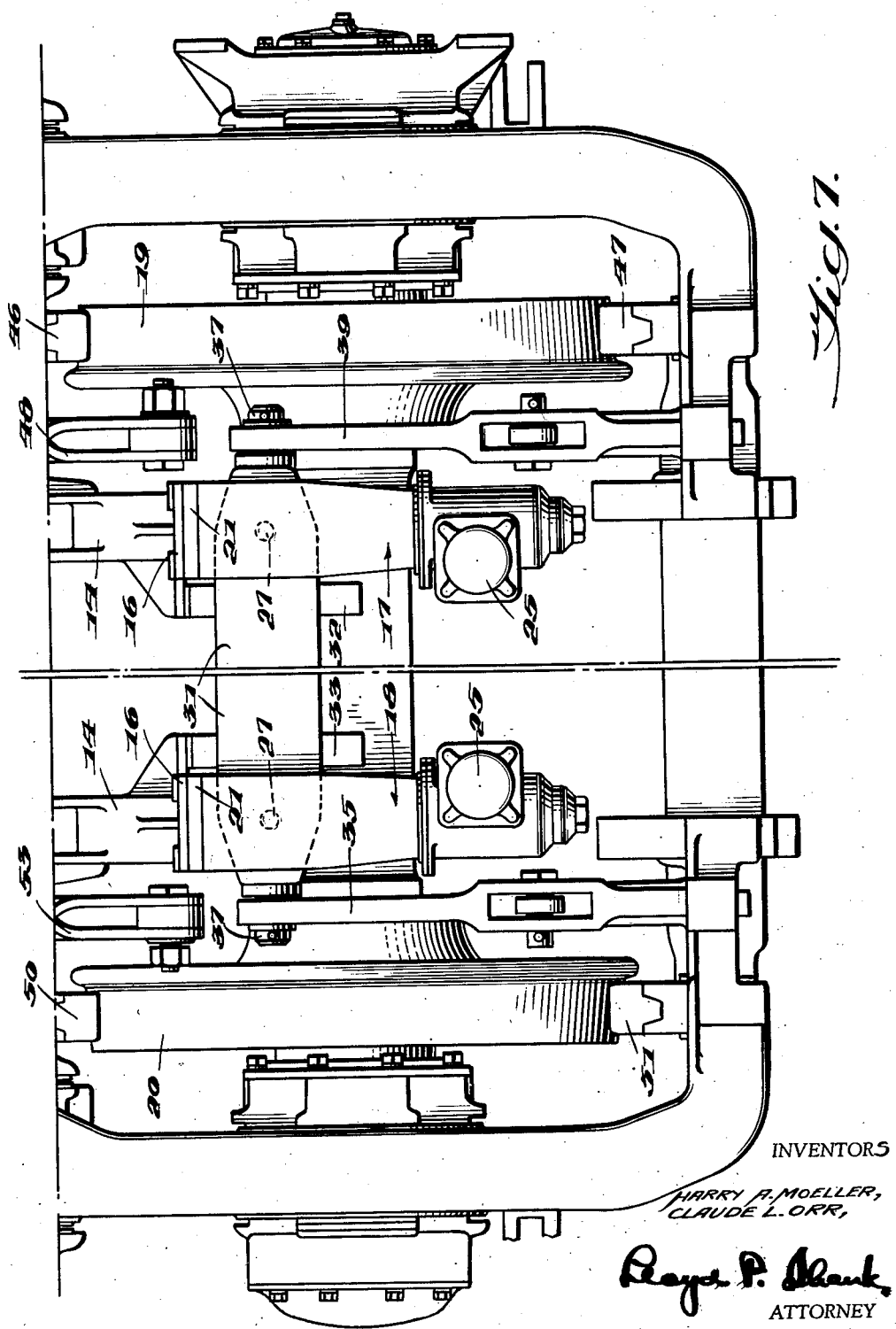

2,612,240

UNITED STATES PATENT OFFICE 2,612,240

SLACK ADJUSTER FOR BRAKES

Harry A. Moeller and Claude L. Orr, Columbus, Ohio, assignors to The Buckeye Steel Castings Company, Columbus Ohio Application November 29, 1948, Serial No. 62,543

8 Claims. (Cl. 188—56)

1

The present invention relates to railway brake systems and more specifically pertains to the mounting of automatic slack adjusters on the resiliently supported bolster of a railway car truck and the invention includes a novel connection between the slack adjuster and the brake rigging so as to permit horizontal and vertical angling movements relative to the dead end fulcrum bars of the brake lever system of a beam extending between the fulcrum bars and connected to the slack adjusters on opposite sides of the truck.

A previous development in railway brakes has been to mount the brake cylinders on the railway trucks. When an automatic slack adjuster is employed in connection with the brake system to shorten the brake cylinder piston travel and arrange the brake shoes nearer the wheels, the automatic slack adjuster has been mounted on the brake cylinder itself or on one of the side frame members of the truck.

An object of the present invention is to mount the slack adjuster on a bracket carried by the bolster of the truck and to arrange the automatic slack adjuster inwardly of the line of the brake lever system to thereby position the slack adjuster inwardly of the wheels to thereby avoid the projection at the sides of the truck frames and to provide a mounting for the slack adjuster facilitating the coupling of this mechanism with the brake rigging.

Another object of the invention is to mount an automatic slack adjuster for the brake linkage system so as to be supported by the bolster of a railway car truck and in such a position that the automatic slack adjuster is arranged adjacent the dead end of the brake lever system and thereby simplifying the connection of the slack adjuster with the brake linkage.

Another and more specific object of the invention is to provide a connection between, a transverse beam forming a part of the brake system and cooperating with the automatic slack adjusters, and the dead end fulcrum bars permitting horizontal angling movement of the beam relative to each fulcrum bar to thereby accommodate the brake linkage to conditions of unequal wear of the brake shoes at each side of the railway truck.

A still further and more specific object of the invention is to provide a connection between the transverse brake beam and the dead end fulcrum bars of the brake rigging which will permit vertical angling movement of the beam with reference to each fulcrum bar and thereby permit the automatic slack adjuster to be mounted on a bracket extension of the bolster system movable vertically in accordance with the resiliently supported bolster without impairing the operation of the brake system.

Other objects and features of the invention will be more apparent as the present disclosure proceeds and upon consideration of the following detailed description and the annexed drawings, wherein an exemplary embodiment of the invention is disclosed and two typical connections are shown and described between the dead end portion of the brake rigging and the transverse beam which is moved automatically by the slack adjuster.

In the drawings:

Fig. 1 is a side elevational view of a portion of a railway car truck of the equalized type and showing a portion of the brake rigging.

Fig. 2 is a fragmentary plan view of a corner portion of the railway car truck showing a mounting of the automatic slack adjuster in relation to brake rigging and exhibiting the invention.

Fig. 3 is a vertical sectional view taken on the center line of the truck.

Fig. 4 is an enlarged plan view of the slack adjuster showing another type of connection between the beam and the dead end fulcrum bar of the brake rigging.

Fig. 5 is a side elevational view of the modification shown in Fig. 4.

Fig. 6 is a perspective view of a block employed in the connection of the brake rigging.

Fig. 7 is a fragmentary plan view showing the slack adjuster mechanisms at both sides of the truck.

In carrying out the present invention an automatic slack adjuster of the type which is well known in the railway brake art is adapted to be mounted on a bracket or an extension forming an integral part of the bolster system of a railway car truck. The mounting of the automatic slack adjuster inwardly of the plane of the wheels of the truck facilitates connection of the slack adjuster with the dead end of the brake linkage assembly and at the same time positions the slack adjusters within the side frames to avoid projections laterally of the truck. It will be understood that a slack adjuster is arranged at each side of the railway car and two automatic slack adjusters are carried by bracket extensions of the bolster. In the drawings one side of the railway truck at the dead end of the brake system is shown in Figs. 1 and 2. It will be understood that a similar mounting is provided at the opposite side of the truck (Figs. 3 and 7) for supporting an automatic slack adjuster which is connected to the horizontal transverse beam which forms part of the brake rigging at the dead end portion of the brake system.

Referring to the drawings, there is shown at 10 a transverse bolster which extends across the truck and is supported on helical springs 11 which rest on the truck frames. The bolster system includes two of such transverse bolsters 10 and a center bolster for use in six or eight-wheel type equalized trucks and which are well known in the art. It will be understood that a unit bolster or the three-piece type of bolster system may be employed in connection with such equalizer type trucks and the present invention provides a mounting of the slack adjusters on brackets carried by either of such bolster structures. The bolster system as represented by one of the transverse bolsters 10 includes a center bolster 12 which carries a bracket or an extension 14 integral therewith, as shown particularly in Fig. 2. This bracket 14 is provided with an end plate 16 having openings or the like through which bolts may extend to support an automatic slack adjuster 17 in a rigid manner on the bolster system. A similar slack adjuster 18 is mounted on a bracket 14 carried by the bolster at the other side of the truck, as illustrated in Fig. 7. The slack adjusters are thereby mounted in position inside of the wheels 19 and 20 and arranged inwardly of the brake lever systems as will be evident upon consideration of Figs. 2 and 7.

The slack adjusters may be of a conventional type such as furnished by the Westinghouse Air Brake Company, and include an end plate 21 which may be bolted or otherwise secured to the end plate 16 of the bracket 14 and thereby maintain the slack adjuster in a substantially horizontal position with reference to the bolster. The slack adjusters each include spaced arms 22 and 23 extending from the end plate 21 so as to provide a space 24 therebetween, as shown in Fig. 3. The automatic slack adjuster mechanism is mounted within a casing 25 and is of the type which serves to move a screw 26 towards the left in Fig. 3 when the brake shoes have worn sufficiently to require an adjustment of the brake linkage for positioning the brake shoes closer to the wheels. The automatic slack adjusters each include within the casing 25, a piston (not shown) which is moved by air from the brake cylinder when a port in the brake cylinder is uncovered as a result of undesired piston travel in the brake cylinder when applying the brakes. The slack adjuster then automatically functions to move the screw 26 to the left for adjusting the position of the brake shoes nearer the wheels whereby the succeeding brake applying operation of the brake cylinder will not require an over-extended movement of the piston in the brake cylinder. The screw 26 carries a pair of ears through which a pin 27 extends. These ears are guided for longitudinal movement in grooves (not shown) provided in the arms 22 and 23 of the slack adjuster.

In carrying out the present invention, a transverse beam 31 is arranged to extend across the truck and is connected to the brake rigging at each side of the chassis. This beam 31 terminates inwardly of the wheels at opposite sides of the truck and extends through the space 24 between the arms of the slack adjusters. In order to avoid the entire load of the beam being carried by the slack adjusters at opposite sides of the truck, a support 32 is provided in the form of a bracket mounted on the bolster extensions 14. A similar support 33 is mounted adjacent the slack adjuster 18. Each of these supports includes a horizontal upper portion 34 and an angular reinforcing portion 35 and an end portion 36 which is bolted or otherwise secured to the face plate 16. The upper horizontal portions of the brackets 32 and 33 support the ends of the beam 31 and thereby relieve the arm portions 23 of the slack adjusters of the load of the beam. The beam 31 is provided adjacent each end with an opening through which pins 27 extend to thereby connect the end portions of the beam 31 to the slack adjusters.

The beam 31 carries a trunnion 37 at each end thereof and this trunnion may be cylindrical shaped, as shown in Figs. 2 and 7. The diameter of the trunnion 37 is desirable larger than the vertical thickness of the beam 31. The end plate 21 provided at the ends of the arms 22 and 23 of each slack adjuster is provided with a slot 40 of such dimensions that the beam 31 may be moved into the space 24 between the arms of the adjuster even though the trunnion is of greater diameter than the dimensions of this space. The trunnion 37 extends through an opening 38 in the dead end fulcrum bar 39 and the opening 38 is of larger diameter than the cross-sectional dimensions of the trunnion 37. The purpose of this structural arrangement will be more evident as the present disclosure proceeds. A similar connection is provided between the other end of the beam 31 and the dead end fulcrum bar 35 at the opposite side of the truck. The ends of the beam 31 are thereby connected to the inner ends of the dead end fulcrum bars of the brake rigging. The braking force acting between the beam 31 and the fulcrum bars 35 and 39 is transmitted through the trunnions 37. The relatively large opening 38 permits horizontal angular adjustment of the beam 31 across the truck which is likely to occur as the result of unequal wear of the brake parts on opposite sides of the truck, and the resulting unequal action of the automatic slack adjusters at the opposite sides of the truck.

The drawings in Figs. 1 and 2 show one brake cylinder 41 at one side of the truck. If found desirable or necessary, two of such brake cylinders may be mounted at spaced intervals lengthwise of the truck at each side thereof. The brake cylinder may be secured to the end of the transverse bolster 10. The piston rod 42 of the brake cylinder is connected by means of a lever 43 to a pull rod or bar 44. If an additional brake cylinder is mounted at this side of the truck the piston thereof may be connected to the pull rod 44 so that the brake cylinders then operate in series to actuate the brakes at one side of the truck through a conventional brake lever system, which includes brake shoes 46 and 47 which are moved into position by actuation of the linkage system shown generally at 48 to the right in Fig. 2. A similar brake arrangement is provided at the other side of the truck which includes brake shoes 50 and 51 and a brake lever system shown generally at 53.

A modified connection between the transverse beam and the dead end fulcrum bars is shown in Figs. 4 and 5 and this connection does not require cutting of the end plate 21 of the automatic slack adjusters. The end plate 21a of this modification extends completely across the ends of the arms 22 and 23 as will be apparent upon consideration of Fig. 5.

The slack adjuster 17 is otherwise unchanged and is of the type to move the beam 31a to the left, in Fig. 4, when this mechanism automatically functions for the purpose of moving the brake shoes closer to the wheels and to thereby take up slack resulting from the wear of the brakes. In this construction the beam 31a is provided with an opening adjacent each end which receives the pin 27 of the slack adjuster mechanism. Outward of the slack adjuster arms 22 and 23 each end of the beam is connected by a pin 51 to the inner end of the dead end fulcrum bar 39a of the brake rigging. The braking force acting between the beam 31a and the fulcrum bar 39a is transmitted through a block 52 having a straight edge portion 53, as will be apparent from consideration of Figs. 4 and 6. This straight edge 53 on the block 52 cooperates with a straight surface 54 forming the edge of the beam 31a. The block 52 is also provided with a convex surface 56 which cooperates with a concave surface 57 formed between the ears 61 and 62 of the dead end fulcrum bar 39a. These surfaces are provided to accommodate an angular position of the beam 31a across the truck which may occur as a result of unequal wear of the brake parts on opposite sides of the truck and the resulting automatically but unequal action of the slack adjusters at opposite sides of the truck. It will be observed from a consideration of Fig. 5 that the edge portion 54 of the beam 31a is convex shaped in vertical section and a cooperating portion of the block 52 is concave shape in vertical section so as to accommodate relative vertical angling movement between the beam 31a and the dead end fulcrum bar 39a. This angling movement takes place because the beam 31a is carried by the spring supported bolster system, whereas the dead end fulcrum bar is connected to the unsprung part of the truck side frame member 71 as shown in Fig. 2. It will be further observed that the hole 66 provided in the end of the beam 31a for receiving the pin 51 is larger in diameter than the pin 51. The inner surfaces 67 and 68 of the ears formed at the end of the dead end fulcrum bar 39a also slope outwardly in proceeding to the right in Fig. 5 to accommodate any relative vertical movement between the fulcrum bar and the beam 31a due to spring deflection.

It will be evident that the slack adjuster mounting as shown in Figs. 4 and 5 is similar in operation to that shown and described in connection with Figs. 1 to 3 and the beam 31a moves to the left in Figs. 4 and 5 when adjustment of the slack in the brake lever system takes place. The mounting of the slack adjusters in this embodiment is such as to likewise position these mechanisms inwardly of the wheels and each slack adjuster is carried by the bracket 14 forming a part of the unit bolster or one of the center bolster parts of a three-unit bolster assembly.

While the invention has been described with reference to the specific structural details, it will be appreciated that changes may be made in the general organization and in the various structural features of the combination. Such changes may be made without departing from the spirit and scope of the invention as set forth in the appended claims.

We claim:

1. A mounting for a brake slack adjuster on a railway car truck comprising, a bolster resiliently supported on side frames of the truck, a bracket extending from the bolster, a slack adjuster mechanism including two spaced arms rigidly secured to said bracket, a substantially horizontal beam arranged transversely of the truck and extending between and beyond both sides of said spaced arms, means for connecting the beam to the slack adjuster mechanism, a dead end fulcrum bar forming a part of a brake rigging for the truck, and means adjacent an outboard side of said spaced arms providing a connection between the end of the beam and the fulcrum bar accommodating horizontal angling movement of the beam with reference to the fulcrum bar and vertical movement of the beam relative to the fulcrum bar.

2. A mounting for a railway brake slack adjuster comprising, a railway car truck including side frames, a bolster resiliently supported on side frames, a bracket extending lengthwise of the truck from the bolster, a slack adjuster mechanism including two spaced arms rigidly secured to said bracket, a beam arranged transversely of the truck and extending between said spaced arms, means connecting the beam to the slack adjuster mechanism, a support for the beam adjacent the slack adjuster arms, a dead end fulcrum bar forming a part of a brake rigging for the truck, and means connecting the end of the beam to the fulcrum bar so as to accommodate horizontal angling movement of the beam with reference to the fulcrum bar and vertical movement of the beam relative to the fulcrum bar.

3. A mounting for a railway brake slack adjuster on a railway car truck comprising, side frames for the truck, a bolster resiliently supported on said side frames, a bracket integral with the bolster, a slack adjuster mechanism including two spaced arms rigidly secured to said bracket, a beam arranged transversely of the truck and extending between said spaced arms, means connecting the beam to the slack adjuster mechanism, a dead end fulcrum bar forming a part of a brake rigging for the truck, a trunnion carried by the end of the beam, a dead end fulcrum bar forming a part of a brake rigging for the railway car truck, and said fulcrum bar having a circular opening therein for receiving the trunnion and being of a larger diameter than the trunnion.

4. A mounting for a slack adjuster for the brake lever system of a railway car truck comprising, side frames for the truck, a bolster resiliently supported on said side frames, a bracket extending lengthwise of the truck from the bolster, a slack adjuster mechanism including two spaced arms rigidly secured to said bracket, a beam arranged transversely of the truck extending between said spaced arms, means for connecting the beam to the slack adjuster mechanism, a dead end fulcrum bar forming a part of a brake rigging for the truck, a trunnion carried by the end of the beam, a dead end fulcrum bar forming a part of a brake rigging, said fulcrum bar having a circular opening therein receiving the trunnion and having a diameter larger than the trunnion, and means carried by said bracket supporting the beam adjacent the slack adjuster.

5. A mounting for a railway brake slack adjuster on a railway car truck comprising, side frames for the truck, a bolster resiliently supported on said side frames, a bracket carried by the bolster, a slack adjuster mechanism including two spaced arms rigidly secured to said bracket, a beam arranged transversely of the truck and extending between said spaced arms, means connecting the beam to the slack adjuster mechanism, a dead end fulcrum bar forming a part of a brake rigging for the truck, spaced ears carried by said fulcrum bar, inner surfaces of said ears diverging outwardly in proceeding toward the free end of the ears, a convex edge on said beam extending between the ears on the fulcrum bar, a block arranged between the ears, a concave surface on the block for engaging the convex edge of the beam, a further convex surface on the block cooperating with a concave surface formed in the fulcrum bar, a pin extending through the ears and the beam, and said pin being of smaller diameter than openings in the ears and in the beam for the pin.

6. In a brake system for a railway car truck, side frames for the truck, a bolster resiliently supported on said side frames, a bracket carried by the bolster, a slack adjuster mechanism including two spaced arms, a face plate carried by said bracket, means securing said arms to said face plate, a beam arranged transversely of the truck and extending between said spaced arms, means connecting the beam to the slack adjuster mechanism, a dead end fulcrum bar forming a part of a brake rigging for the truck, spaced ears carried by the end of said fulcrum bar, inner surfaces of said ears diverging outwardly in proceeding toward the free end of the ears, a convex surface forming a straight edge of said beam, a block arranged between the ears, a concave surface on the block engaging the convex surface of the beam, a convex surface on the block cooperating with an adjacent concave surface formed between the ears of the fulcrum bar, a pin extending through the ears and the beam, and said pin being of smaller cross section than openings for the pin in the bars and the beam.

7. A slack adjuster and brake beam assembly for a railway car truck comprising, a side frame at each side of the truck, a bolster resiliently supported on said side frames, wheels at opposite sides of the truck, a slack adjuster mechanism rigidly supported by the bolster inboard of the wheels at one side of the truck, a second slack adjuster mechanism rigidly supported by the bolster inboard of the wheels at the other side of the truck, a horizontal beam arranged transversely of the truck spanning said slack adjuster mechanisms, means connecting said beam to both slack adjuster mechanisms, a brake lever rigging arranged inboard of the wheels at one side of the truck and positioned outboard of the associated slack adjuster mechanism, means connecting the beam to said brake lever rigging, a brake lever rigging arranged inboard of the wheels at the other side of the truck and outboard of the associated slack adjuster mechanism, and means connecting the beam to the second brake lever rigging.

8. In a railway brake system for a railway car truck including side frames, a bolster resiliently supported on said side frames, two brackets extending lengthwise of the truck from the bolster, a slack adjuster mechanism including two spaced arms rigidly secured to one of said brackets, a second slack adjuster mechanism including two spaced arms rigidly secured to the other of said brackets, a horizontal beam arranged transversely of the truck extending between and beyond the spaced arms of one slack adjuster mechanism and between and beyond the spaced arms of the other slack adjuster mechanism, means connecting said beam to each of said slack adjuster mechanisms, a brake rigging including a dead end fulcrum bar at one side of the truck, a brake rigging including a dead end fulcrum bar at the other side of the truck, and means connecting the ends of said beams to the fulcrum bars.

HARRY A. MOELLER.
CLAUDE L. ORR.

REFERENCES CITED

The following references are of record in the file of this patent:

UNITED STATES PATENTS

| Number | Name | Date |
| --- | --- | --- |
| 2,118,753 | Baselt | May 24, 1938 |
| 2,343,941 | Tack | Mar. 14, 1944 |
| 2,472,169 | Mueller | June 7, 1949 |